J. W. HAGGARD.
Combined Harrow and Clod-Crusher.
No. 199,905. Patented Feb. 5, 1878.
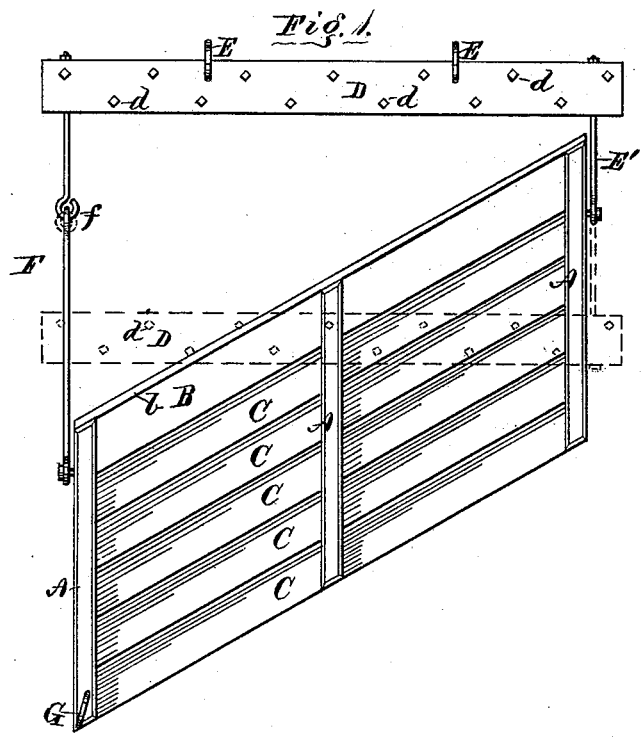
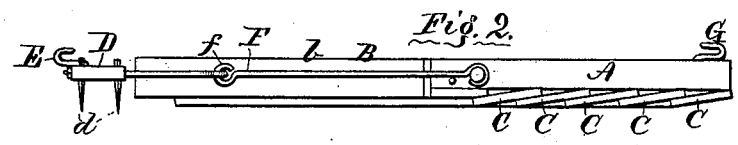
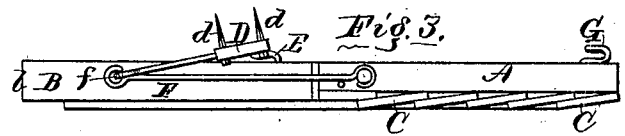
Witnesses:
M. H. Barringer.
E. L. Field.
Inventor:
John W. Haggard,
By W. B. Richards,
Atty.
N. PETERS, PHOTO-LITHOGRAPHER, WASHINGTON, D. C.

UNITED STATES PATENT OFFICE.

JOHN W. HAGGARD, OF BLOOMINGTON, ILLINOIS, ASSIGNOR OF ONE-HALF HIS RIGHT TO ELIZA C. HAGGARD, OF SAME PLACE.

IMPROVEMENT IN COMBINED HARROW AND CLOD-CRUSHER.

Specification forming part of Letters Patent No. 199,905, dated February 5, 1878; application filed December 18, 1877.

*To all whom it may concern:*

Be it known that I, JOHN W. HAGGARD, of Bloomington, in the county of McLean and State of Illinois, have invented certain new and useful Improvements in Combined Harrow and Clod-Crusher; and I do hereby declare that the following is a full, clear, and exact description of my invention, which will enable others skilled in the art to which it appertains to make and use the same, reference being had to the accompanying drawings, and to letters of reference marked thereon, which form a part of this specification.

Figure 1 is a top-plan view of a construction embodying my invention. Fig. 2 is a side elevation, the parts in working position. Fig. 3 is a side elevation, the parts in position for local transportation.

My invention has for its object to furnish an improved construction of clod-crusher and harrow combined therewith, the harrow in advance of the clod-crusher, so that it may bring the clods to the surface for the action of the crusher, and the harrow so attached to the clod-crusher that it (the harrow) may be folded back thereon for local transportation.

The first part of my invention relates to the clod-crusher; and consists in overlapping slats, arranged obliquely on a suitable frame, adapting them to crush or pulverize clods in passing over them, and to pass to one side such as it fails to crush.

The second part of my invention relates to the combination of a harrow with my improved clod-crusher; and consists in connecting the harrow to the clod-crusher so that it may be dragged in advance of it; and, further, in so hinging it that the harrow may be folded back upon the clod-crusher, all as hereinafter fully described, and set forth in the claims hereto annexed.

Referring to the drawings by letters, the same letter is used in the different views to represent the same part or parts.

A A A represent three bars, connected at their front ends by a bar, B, which is arranged obliquely to the bars A, to constitute therewith a rhomboidal-shaped frame, as plainly shown at Fig. 1. The front edge of the bar B should, preferably, be enlarged, or a board, $b$, may be attached thereto. Letters C represent slats secured to the bars A in positions parallel with the bar B, and with the front edge of each slat overlapping the rear edge of the adjacent forward slat, as shown in Figs. 2 and 3 of the drawings. The foregoing constitutes the clod-crusher.

D is a bar, provided with ordinary harrow-teeth $d$ and hooks E, to which the draft animals may be attached. The bar D is arranged in front of the clod-crusher, at right angles to the bars A. E' is a short rod attached at its forward end to one end of the bar D, and its other end hinged to one of the bars A.

F is a longer rod hinged at one end to a bar, A, and its other end secured to the opposite end of the bar D from the rod E'. The rod F is hinged, its front end to the rear end of a rod at $f$, at a point opposite the hinge of the rod E'.

Figs. 1 and 2 show the device in position for operation in the field. The harrow D being dragged at right angles to the line of progression of the machine, the slats C will be drawn obliquely to the bar D and to said lines of progression. The harrow-teeth $d$ will tend to stir the clods to the surface, and the exposed front edges of the slats C will tend to crush and pulverize them, and such as are not pulverized thereby will be passed to one side of the clod-crusher by the oblique slats C; and it will be evident that, by proper management in going around given lands, the uncrushed clods may be worked into the dead furrows, or to any other desired places.

The harrow-bar D may be folded back upon the clod-crusher, as shown by dotted lines at Fig. 1 and by full lines at Fig. 3, and when so folded a team may be hitched to the hook G, at the acute rear angle of the clod-crusher, and the machine be dragged from field to field, or for other local transportation.

Having thus described my invention, I claim as new and desire to secure by Letters Patent—

1. A clod-crusher formed of obliquely-arranged overlapping slats C, secured to frame-bars A, substantially as and for the purpose specified.

2. In combination with a clod-crusher formed of overlapping obliquely-arranged slats C, a harrow, D, connected therewith by a longer rod, F, and shorter rod E'.

3. A rhomboidal-shaped clod-crusher having overlapping slats C and a draft-hook, G, at its rear end, substantially as described, and for the purpose specified.

In testimony that I claim the foregoing as my own I affix my signature hereto in presence of two witnesses.

J. W. HAGGARD.

Witnesses:
 THOMAS McKEE,
 E. L. FIELD.